W. QUANN & W. T. SMITH.
MELTING AND SMELTING FURNACE.
No. 51,266.   Patented Nov. 28, 1865.
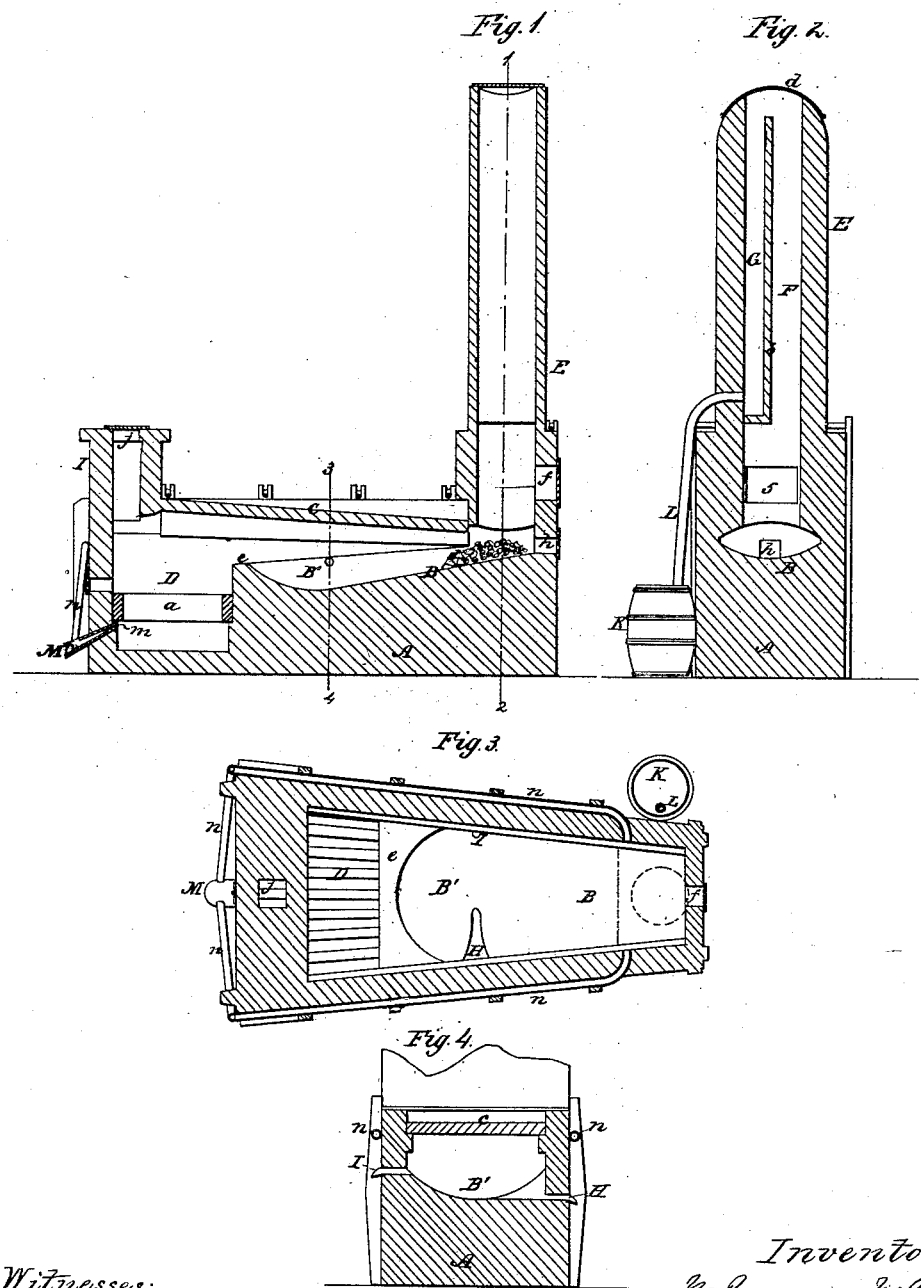
Witnesses:
Wm Albert Steel
John Parker
Inventors:
W. Quann & W. T. Smith
By their Atty
H. Howson

UNITED STATES PATENT OFFICE.

WILLIAM QUANN AND WILLIAM T. SMITH, OF PHILADELPHIA, PENNSYLVANIA, ASSIGNORS TO THEMSELVES, A. R. WETMORE, OF NEW YORK, N. Y., AND CHAS. C. LATHROP, OF DELANCO, NEW JERSEY.

IMPROVED MELTING AND SMELTING FURNACE.

Specification forming part of Letters Patent No. 51,266, dated November 28, 1865.

*To all whom it may concern:*

Be it known that we, WILLIAM QUANN and WILLIAM T. SMITH, both of Philadelphia, Pennsylvania, have invented an Improved Melting and Smelting Furnace; and we do hereby declare the following to be a full, clear, and exact description of the same, reference being had to the accompanying drawings, and to the letters of reference marked thereon.

Our invention consists of a furnace, constructed in the peculiar manner fully described hereinafter, for the rapid and economical reduction of ores of gold, silver, copper, &c.

In order to enable others skilled in the art to make and use our invention, we will now proceed to describe its construction and operation.

On reference to the accompanying drawings, which form a part of this specification, Figure 1 is a vertical section of our improved melting and smelting furnace; Fig. 2, a transverse vertical section on the line 1 2, Fig. 1; Fig. 3, a sectional plan view, and Fig. 4 a transverse vertical section on the line 3 4, Fig. 1.

Similar letters refer to similar parts throughout the several views.

A is the body or foundation of the furnace; B, the inclined bed; B', the basin; C, the roof; D, the fire-place; $a$, the grate, and $e$ the bridge.

The basin of the furnace, near the bridge, is of the concave form represented in the drawings, and is the receptacle for the molten metal. The bed B is inclined from this basin upward toward the chimney E, the concave form being preserved throughout the entire length of the bed.

The chimney is separated into two compartments, F and G, by a partition, Fig. 2, and is surmounted with a cap, $d$, so hinged to the top of the chimney that it can be made to close or expose the opening in the same.

At the rear of the furnace, near the base of the chimney, are two openings, $f$ and $h$, for a purpose described hereinafter, both openings being furnished with suitable doors.

I is the feed-chamber situated at the front of the furnace for the reception of fuel, which is passed through the opening $j$ onto the grate $a$.

At one side of the furnace, near the chimney, is a vessel, $k$, containing salt and water, into which the lower end of the pipe L is immersed, the upper end of the said pipe communicating with the compartment G of the chimney.

M is a blast-pipe having three branches, the central one, $m$, of which passes through the front wall of the furnace and terminates beneath the grate $a$, the other branches, $n\ n$, being continued—one on each side of the furnace—to a point near the chimney, where both communicate with the inclined flue leading from the basin B to the chimney.

H is the tapping-hole, and I the hole through which the slag or scoria is discharged, the former being on a level, or thereabout, with the bottom of the basin, and the latter being situated at a greater altitude, as best observed on reference to Fig. 4.

The above-described furnace has been designed for the purpose of carrying out the process of smelting ores of gold, silver, copper, &c., for which Letters Patent were granted to William Quann, Wm. A. Taylor, A. R. Wetmore, and Charles C. Lathrop on the 16th day of December, A. D. 1862, the said invention consisting in the use of wood-ashes, animal-charcoal, carbonate of ammonia, oil, or other resinous matter, salt, bone-dust, sulphur, and sand in the process of smelting gold, silver, copper, and all other ores excepting iron.

It is well known that in the reduction of ores of gold, silver, copper, and other metals many elaborate processes have been adopted, all more or less costly and tedious to conduct in smelting copper, especially by what is known as the Swansea process. The operations and preparatory treatment of the ores are not only most tedious, but demand the supervision of the most expert attendants.

In the use of our furnace no preparatory treatment of ores is necessary other than that of soaking them in ammoniacal salts for about twelve hours before smelting, as stated in the aforesaid patents. The fuel deposited on the grate through the opening $j$ having been ignited, the said opening closed by a suitable door, the doors of the openings $f$ and $h$ being also closed, and the cap or cover of the chimney open, the blast is admitted to the pipe M until the furnace is thoroughly heated, when the prepared ore and a flux are passed through the opening $f$ onto the inclined bed of the furnace, where it takes its place beneath the chimney, as indicated in Fig. 1. Here it is subjected to the direct heat of the products of combustion, this heat being intensified by the blasts passing through the pipes $m$ on the opposite sides of the furnace, these blasts meeting the products of combustion, where the latter impinge against the ore, which is speedily reduced, the molten metal and scoria flowing into the basin B, from which the metal may be withdrawn through the tapping-hole H, the slag or scoria being discharged through the hole I, which may be opened for that purpose from time to time, as circumstances suggest. When the furnace has been thoroughly heated and in full operation the top of the chimney is closed, while the blast is continued and the ore and flux introduced through the opening F from time to time. When the chimney has been thus closed a reaction of the blast takes place in the furnace, and the metal is thereby maintained in a constant state of circulation round the basin, owing to its concave form, every portion of the metal being consequently subjected to the most intense heat. Much of the metallic portion of the ore passes off, in the form of vapor, up the compartment F of the chimney, down the compartment G, and through the pipe L into the contents of the vessel K, where the vapors are condensed, the solidified particles being from time to time removed from the vessel and subjected to the melting process in the furnace.

The furnace is simple in construction, and may be made of limited dimensions compared with the elaborate furnaces heretofore used for the same purpose. The process of smelting, too, is conducted rapidly and without intermission.

We claim as our invention and desire to secure by Letters Patent—

1. The basin H of the furnace, made of the concave form represented, for the purpose specified.

2. The combination and arrangement of the said concave basin with the slag-hole I and tapping-hole H.

3. The arrangement of the inclined bed of the furnace and the blast openings and pipes $n\,n$.

4. The chimney E, with its cover $d$ and two compartments, F and G.

5. The combination of the said chimney and its compartments with the pipe L and vessel K, or their equivalents.

6. The combination and arrangement, substantially as described, of the basin and bed of the furnace, the chimney, and the opening $f$.

In testimony whereof we have signed our names to this specification in the presence of two subscribing witnesses.

WILLIAM QUANN.
WILLIAM T. SMITH.

Witnesses:
E. P. DELANEY,
HENRY HOWSON.